April 13, 1937. A. WINE 2,076,805
FAUCET
Filed Aug. 14, 1935
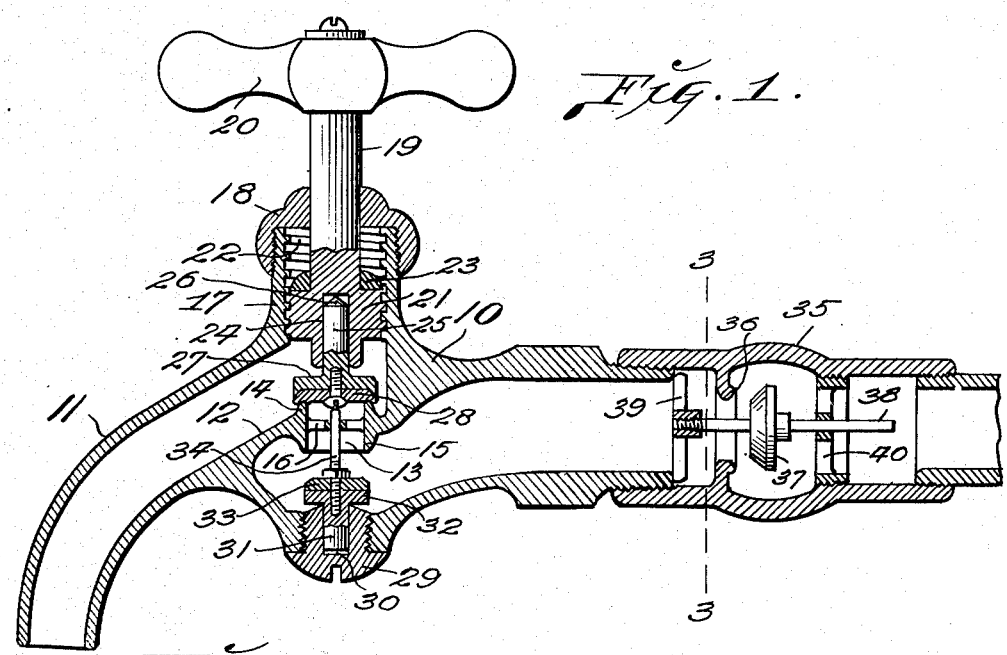
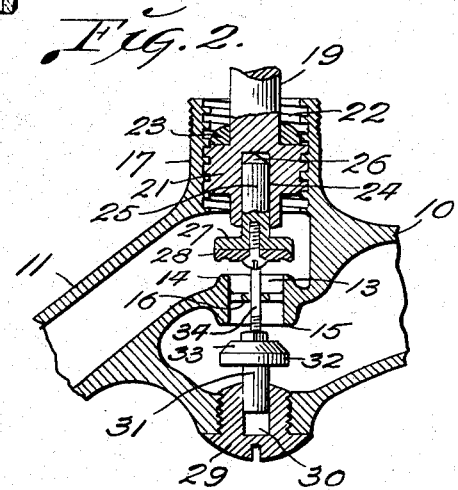
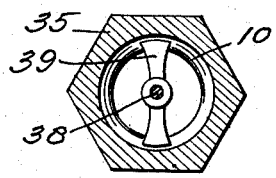
INVENTOR,
ALBERT WINE.
By Martin O. Smith ATTY.

Patented Apr. 13, 1937

2,076,805

UNITED STATES PATENT OFFICE 2,076,805

FAUCET

Albert Wine, Glendale, Calif.

Application August 14, 1935, Serial No. 36,071

1 Claim. (Cl. 277—27)

My invention relates to a faucet and has for its principal objects, to generally improve upon and simplify the construction of the existing types of faucets and to provide a faucet having primary and secondary valves for controlling the flow of liquid through the faucet and the two valves being arranged so that the secondary valve is held off its seat when the primary valve is positioned upon its seat to cut off the flow of liquid through the faucet and said secondary valve being arranged to close and cut off the flow of liquid through the faucet when the primary valve is lifted from its seat to a predetermined position and which arrangement enables the primary valve of the stem carrying same to be removed from the faucet to permit the removal and replacement of the valve packing disc or washer in the event that the same becomes worn to such a degree as to render it unfit for service. Thus the packing of the primary valve may be accomplished without the necessity for closing the valve or cutoff that is located in the main or supply pipe to which the equipped faucet is connected.

A further object of my invention is, to provide a faucet wherein the primary valve is associated with the valve stem so that the latter when rotated during valve opening and closing movements operates independently of the primary valve, thus minimizing wear between the packing ring or disc of the primary valve and its seat.

A further object of my invention is, to combine with a faucet, a nipple or fitting to which the body of the faucet is detachably connected and said nipple or fitting having a valve seat and the valve that is adapted to rest upon said seat and which valve is held off its seat in open position when the faucet body is properly connected to the nipple and said valve being automatically closed by the pressure of the water through the fitting or nipple when the faucet is detached from the nipple or fitting for the purpose of inspection or repairs.

As a result of my improved construction, the faucet may be bodily removed from the nipple or fitting and also the primary valve of the faucet and the stem which operates said primary valve may be removed without necessitating the closing of the valve or cutoff in the branch supply pipe that leads from the service main to the faucet.

With the foregoing and other objects in view my invention consists in certain novel features of construction and arrangements of parts that will be hereinafter more fully described and claimed and illustrated in the accompanying drawing in which:

Fig. 1 is a vertical section taken lengthwise through the center of a faucet constructed in accordance with my invention, with the valve that controls the flow of water through said faucet in closed position.

Fig. 2 is a fragmentary section similar to Fig. 1 and showing the valve in open position.

Fig. 3 is a cross section taken on the line 3—3 of Fig. 1.

Referring by numerals to the accompanying drawing which illustrates a preferred embodiment of my invention, 10 designates the body of the faucet, which is conventional in form and provided with the usual spout 11.

Formed within the body of the faucet is a partition 12, the central portion of which is horizontally disposed and formed through said central portion is an opening 13.

Formed on top of the partition around the opening therein, is an annular valve seat 14 and a similar valve seat 15 is formed around the opening on the underside of the partition.

Formed integral with the partition and extending diametrically across opening 13, is a narrow yoke 16, the center of which is perforated to provide a bearing for a stem that is carried by the valve that engages seat 15.

Projecting upwardly from the faucet body above the opening 13 therein, is a short tubular member 17 and removably mounted on the upper portion thereof, is a cap 18. Extending through an opening that is formed in the center of this cap is a rotating valve stem 19 on the upper end of which is mounted a suitable handle 20.

Formed integral with that portion of the stem that projects into the tubular member 17, is a head 21 that is externally threaded for engagement with a thread 22 that is formed on the inner face of tubular member 17.

Positioned on top of head 21 and surrounding stem 19, is a packing ring 23 of elastic or compressible material.

Formed in the lower portion of stem 19, is an axial bore 24 that is occupied by a stem 25, the upper end thereof terminating in a conical point 26 that bears against the inner end of the bore 24.

Carried by the lower end of stem 25, is a disc 27 and detachably secured to the underside thereof, is a packing disc or gasket 28 of fiber, soft metal or the like and which is adapted to rest on seat 14 and thereby cut off the flow of liquid through opening 13.

Screw-seated in the lower portion of the faucet body 10, directly below opening 13, is a cap 29, in the upper portion of which is formed an axial bore 30 and arranged for sliding movement in said bore is a short stem 31.

Carried by the upper end of this stem, is a head 32 and on the upper face thereof, is positioned a packing disc or gasket 33 that is adapted to rest on the lower valve seat 15.

Projecting upwardly from head 32, through the packing disc or gasket, is an axially disposed stem 34, which stem passes through the aperture in yoke 16.

Detachably secured to the inlet end of the faucet body 10, is a short nipple or tubular fitting 35 and formed therein, is an annular valve seat 36.

Arranged for operation within this fitting 35 and adapted to rest on seat 36 under certain conditions, but normally held away from said seat, is a valve 37, provided with a stem 38.

Mounted on the forward end of this stem in front of seat 36, is a cross arm 39, which when the faucet and nipple are properly connected to each other, rests against the end of the faucet that screws into the nipple and thereby normally holds valve 37 off the seat 36, as illustrated in Fig. 1.

The rear portion of stem 38 is mounted for sliding movement through a guide 40 that is removably seated in nipple 35.

The liquid supply pipe or main is connected to nipple 35 in the conventional manner. Thus when the nipple is connected to the supply pipe and the faucet is properly connected to the nipple, valve 37 is held off its seat so that fluid may readily flow through the nipple to the faucet.

In the event that it becomes necessary to remove the faucet from the nipple for the purposes of inspection, adjustment or repairs, the valve 37 will, under pressure of the fluid from the supply pipe or main, move onto seat 36 and said valve will be retained on said seat by the pressure of the liquid against said valve and thus the faucet may be removed and repaired without necessitating closing of the valve or cutoff that is located in the main or supply pipe to which nipple 35 is connected.

To open the faucet, stem 19 is rotated and this engagement of the threads on head 21 with the head 22, will elevate said stem and valve 27 and packing member 28 will move upward so as to permit liquid to flow through opening 13.

The upward movement of valve 27 controls the upward movement of valve 32 inasmuch as the stem 34 bears against the underside of the valve 27 and if it becomes necessary to remove valve 27 from the faucet for the purpose of repacking the same, stem 19 carrying head 21 is rotated so that said head is moved to its limit of upward movement in tubular member 17 and such movement permits the packing disc 33 carried by valve 32, to engage seat 15 where it is held by the pressure of the liquid in the inlet end of the faucet and thus the flow of liquid is cut off through opening 13. Cap 18 is unscrewed from tubular member 17 and this permits stem 19, head 21 and valve 24 to be readily removed and under such conditions valve 32 cuts off the flow of liquid through opening 13.

Inasmuch as valve 27 and stem 25 are formed separate from stem 19, said parts may rotate independently of the stem 19 and as a result there is very little if any wear upon packing member 28 as it is moved onto and away from the seat 14.

The movement of stem 31 carrying valve 32 and its packing member upwardly through bore 30, will be resisted by the partial vacuum produced in the lower portion of the bore beneath stem 31 so that chattering of valve 32 as it approaches its seat 15, will be prevented.

Thus it will be seen that I have provided a faucet that may be wholly removed from the supply pipe without necessitating the closing of the valve or cutoff in said supply pipe and likewise the primary valve that controls the flow of liquid through the faucet may be removed for inspection and repairs without necessitating the closing of the valve or cutoff in the supply pipe to which the faucet is connected.

It will be understood that minor changes in the size, form and construction of the various parts of my improved faucet may be made and substituted for those herein shown and described without departing from the spirit of the invention, the scope of which is set forth in the appended claim.

I claim as my invention:

A faucet, comprising a body having a fluid flow passageway, a partition extending across said passageway, which partition is provided with an opening, seats formed on said partition above and below said opening, a manually operable head screw-seated in the faucet body above the opening in said partition, said head being provided in its lower portion with an axial bore, a stem mounted to rotate freely in said bore, the upper end of said stem terminating in a pointed bearing that engages the bottom of said axial bore, a valve carried by the lower end of said stem and adapted to engage the upper one of the seats on said partition, a plug removably seated in the faucet body below the opening in the partition therein, said plug being provided in its upper portion with an axial recess, a stem loosely mounted in said recess, a valve carried by the upper end of said stem, which valve is adapted to engage the seat on the under side of said partition, a separately formed axially disposed rod screw seated in said last-mentioned valve and projecting upwardly through the opening in the partition and adapted to engage the under side of the valve that is positioned above said partition, a lock nut mounted on the threaded portion of said rod and bearing on top of the valve in which said rod is seated and a bearing for said rod formed within the opening in said partition.

ALBERT WINE.